United States Patent Office 3,440,745
Patented Apr. 29, 1969

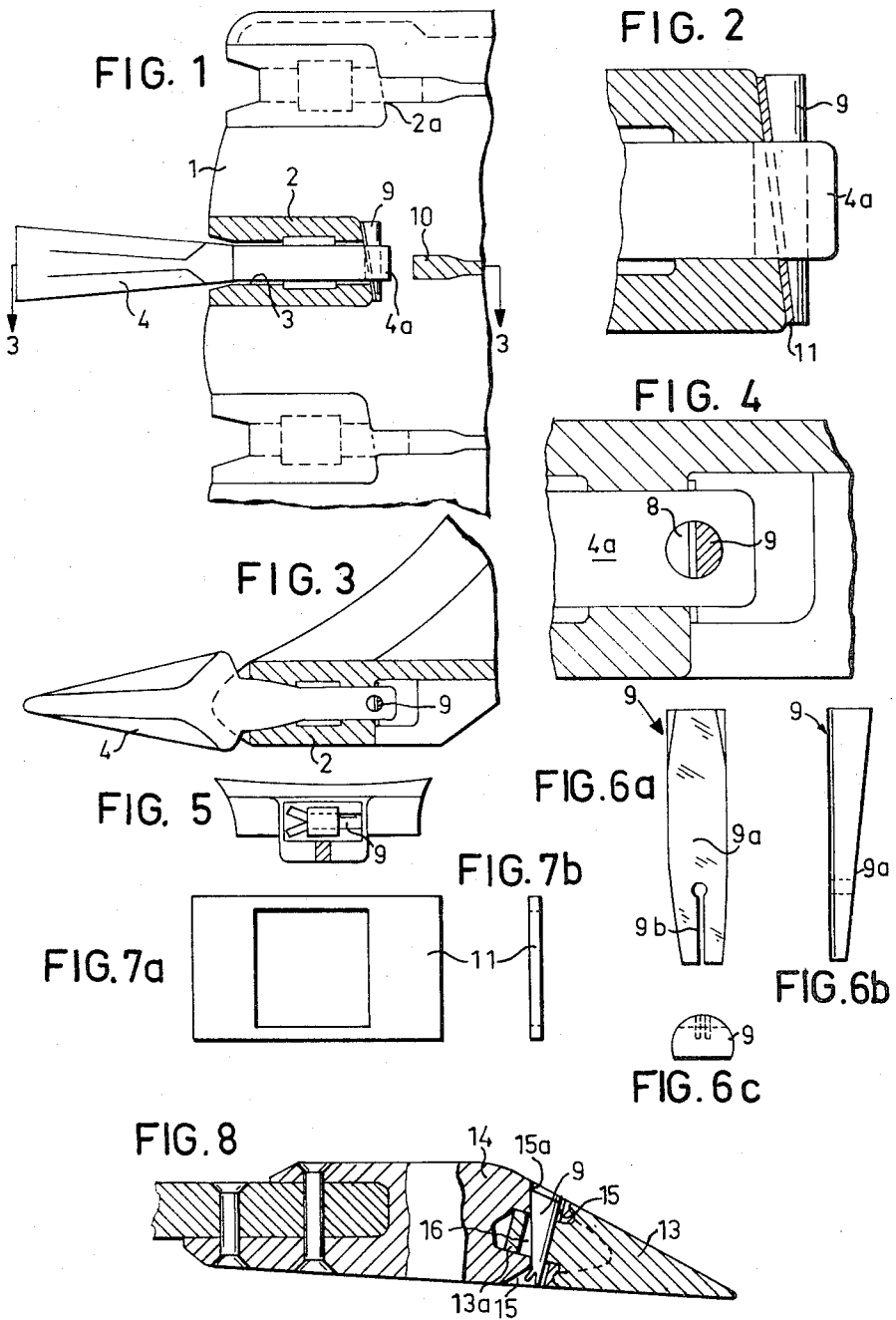

3,440,745
FASTENING DEVICE FOR TEETH FOR DIGGING AND CULTIVATING IMPLEMENTS
Bertil Olof Palm, Stockholm, Sweden, assignor to Tornborg & Lundbert Aktiebolag, Stockholm, Sweden
Filed May 19, 1966, Ser. No. 551,337
Claims priority, application Sweden, May 25, 1965, 6,881/65
Int. Cl. E02f 9/28; F16b 9/00
U.S. Cl. 37—141                3 Claims

ABSTRACT OF THE DISCLOSURE

A device for locking detachable projecting teeth to digging or cultivating implements is characterized by pockets in which the teeth shanks are insertable. The shank has a cylindrical bore, and a cylindrical wedge of the same radius as the bore slides in the bore. The wedge has a planar surface which is inclined to the axis of the bore, and a correspondingly inclined fixed surface is provided, the two inclined surfaces sliding against each other with a wedge action.

---

This invention relates to digging and cultivating implements, such as excavating buckets, road planers, agricultural implements and the like, and has special reference to devices for fastening teeth, such as dipper teeth, to such implements.

In prior-art devices of this kind in which a wedge for fastening detachable teeth is used the transverse or through hole in the shank of the tooth for receiving the wedge usually has an extended profile which in view of the extremely hard material of the shank of the tooth involves a great cost for making the hole. Further, the wedges used in prior-art devices have the disadvantage that they do not render possible, in a satisfactory manner, renewed fastening of the tooth in the tooth pocket if the tooth after some time of use has shaken loose or begun to work loose.

An object of this invention is to eliminate these inconveniences and to provide a simple and reliable fastening device at considerably lower cost than previously known devices.

This and other objects are attained by the present invention.

Two embodiments of the invention will be described more closely hereinbelow with reference to the annexed drawing in which FIG. 1 illustrates the edge of the dipper of an excavating bucket provided with tooth pockets and a tooth fastened in accordance with the invention. FIG. 2 illustrates part of FIG. 1 to an enlarged scale. FIG. 3 is a sectional view taken along line 3—3 of FIG. 1, and FIG. 4 illustrates part of FIG. 3 to an enlarged scale. FIG. 5 illustrates the shank of the tooth and the wedge as viewed from behind. FIGS. 6a to 6c illustrate the wedge as viewed from the front, from the side and from above, respectively. FIGS. 7a and 7b illustrate a spacer viewed from the front and from the side, respectively. FIG. 8 illustrates a modified application of the invention for fastening a tooth point to a tooth base.

In the drawing reference numeral 1 denotes a dipper edge provided on the digging side of an excavating bucket. At the front end of the dipper edge there are formed rims 2 which are cast integral with the dipper edge. The rims define tooth pockets devised to receive teeth 4 one of which is shown in FIG. 1. The tooth pockets are in the form of through holes 3 in the rim which at its rear end has a substantially vertical shoulder 2a. As will be best seen from FIG. 3, the upper and lower sides of the tooth pockets are rearwardly tapering like a wedge. The shanks 4a of the dipper teeth are formed correspondingly. Advantageously, the upper and lower surfaces of the tooth pockets are formed with two converging guide surfaces engaging corresponding surfaces of the shanks of the teeth.

The rear portion of the shank of each tooth projecting from the tooth neck has a transverse hole 8 for a wedge 9 which when driven into the hole is supported against the shoulder 2a of the rim 2.

The transverse hole 8 is circular-cylindrical and is made by drilling the shank of the tooth. The wedge 9 the shape of which is best seen from FIG. 6 is made from a circular-cylindrical body having substantially the same radius as the through hole 8. Part of this body has been removed so that the remaining body has a planar upper surface 9a which is inclined toward a front edge.

As viewed from above the shoulder 2a is directed obliquely with respect to the longitudinal axis of the tooth pocket at an angle which is equal to the angle of the wedge 9. The rear end of the shank of the tooth is rearwardly completely exposed and easily to be reached by striking tools. The part 10 is a rear narrow supporting rib aligned with the rim 2.

The wedge 9 (FIG. 6) also has a slot 9b which facilitates retention of the wedge in locking position. Consequently, the wedge body functions both as a wedge and a split cutter. If the tooth after some time of use shakes loose it is only necessary to drive the wedge further in resulting in an increase of the angle between the sides of the slot, as illustrated in FIG. 5.

One or more spacers 11 may be slid onto the rear end of the shank of the tooth projecting out of the tooth pocket before the wedge is driven into the transverse hole for the purpose of compensating for tolerance variations of the tooth shank and tooth pocket. In this way the spacers contribute to the possibility of using a transverse hole of small diameter and small extension longitudinally of the shank of the tooth as well as a wedge member of partly curved section and of substantially the same radius as the hole for accurately fixing the tooth in the tooth pocket even in cases where accurate tolerances are not required for said parts or if these parts are subjected to considerable wear in operation.

FIG. 8 illustrates an example of the invention as applied to the fastening of a tooth point 13 having a shank 13a to a tooth base 14 which in turn may be detachably secured to a tool. The wedge 9 and the hole 16 in the shank of the tooth are devised in the same manner as in the above described embodiment. The tooth base 14 has a recess 15 on either side of the shank 13a, said recess having upper and lower planar portions 15a for engagement with the planar portion 9a of the wedge. Apart therefrom the recess 15 may have any suitable shape.

The invention results in a fastening device which has considerable advantages as compared with prior-art devices comprising round pins which do not exert a sufficient wedge-driving edge on the shank of the tooth or comprising wedge members cooperating with long through holes in the shank of the tooth which members require considerably higher costs without permitting simple and reliable fixation of the teeth and without being able advantageously to function as split cutters.

What I claim is:
1. A device for locking detachable projecting teeth to a digging or cultivating implement comprising means defining pockets, each of said teeth having a shank insertable into a said pocket, the shank having a bore of substantially circular-cylindrical shape, the pocket-defining means having a flat surface inclined to the axis of said bore when said shank is inserted in a said pocket, the locking device comprising a wedge insertable in said bore and having along at least a substantial portion of its length and for a substantial portion of its periphery a curved portion substantially of the same radius as the bore and in inserted position engaging the inside of the bore, said wedge also having a flat surface extending at an acute angle to the axis of the bore and engageable with said inclined surface of the pocket-defining means, said wedge and said pocket-defining means contacting each other substantially only along said flat surfaces.

2. A device as claimed in claim 1, wherein the wedge is made from a circular-cylindrical body from which material is removed so as to form substantially said planar surface of the wedge.

3. A device as claimed in claim 1, wherein said tooth comprises a base member and a removable point having a shank and wherein said point is lockable to the base member, the locking means comprising said bore in the shank and said wedge, said inclined surface being formed within said base member, said base member being secured to said implement.

References Cited
UNITED STATES PATENTS

| | | | |
|---|---|---|---|
| 943,775 | 12/1909 | Exton et al. | 37—142 |
| 1,769,998 | 7/1930 | Jenkins | 37—141 |
| 1,775,984 | 9/1930 | Younie | 37—141 |
| 1,780,397 | 11/1930 | McKee et al. | 37—142 |
| 1,872,307 | 8/1932 | Lehman | 37—141 |
| 1,925,420 | 9/1933 | Van Buskirk | 37—142 |
| 1,992,591 | 2/1935 | Whisler | 37—142 XR |
| 2,145,663 | 1/1939 | Reynolds | 37—141 XR |
| 2,204,718 | 6/1940 | Younie | 37—142 |
| 2,263,215 | 11/1941 | Larsen | 37—142 |
| 2,393,706 | 1/1946 | Page | 37—142 |
| 2,702,490 | 2/1955 | Launder | 37—142 XR |
| 2,919,506 | 1/1960 | Larsen | 37—142 |
| 2,984,028 | 5/1961 | Renner et al. | 37—142 |
| 3,121,289 | 2/1964 | Eyolfson | 37—142 |

EDGAR S. BURR, *Primary Examiner.*

U.S. Cl. X.R.

37—142